United States Patent [19]
Goettl

[11] 3,979,963
[45] Sept. 14, 1976

[54] ADJUSTABLE V BELT PULLEY

[76] Inventor: Adam D. Goettl, P.O. Box 1036, Phoenix, Ariz. 85016

[22] Filed: June 9, 1975

[21] Appl. No.: 585,390

[52] U.S. Cl. ............................. 74/230.3; 74/230.8; 74/230.17 B; 74/230.17 C; 403/227
[51] Int. Cl.² ................. F16H 55/52; F16H 55/54; F16H 55/49
[58] Field of Search ............ 74/230.17 C, 230.17 B, 74/230.3, 230.8, 230.16; 403/372, 227

[56]  References Cited
UNITED STATES PATENTS

| | | | |
|---|---|---|---|
| 622,214 | 4/1899 | Fletcher | 74/230.3 |
| 955,227 | 4/1910 | Junis | 74/230.3 |
| 1,832,871 | 11/1931 | Meyer | 74/230.8 |
| 2,209,737 | 7/1940 | Livingston | 74/230.17 C |
| 2,641,981 | 6/1953 | Pilsner | 74/230.17 C |
| 2,705,643 | 5/1955 | Green | 403/227 |
| 2,834,220 | 5/1958 | Kingdom | 74/230.17 C |
| 3,407,627 | 10/1968 | Latsch et al. | 403/227 |

Primary Examiner—Samuel Scott
Assistant Examiner—Allan R. Burke

[57]  ABSTRACT

The disclosure relates to an adjustable V belt pulley which is readily adjustable so as to vary the pitched diameter of the pulley at which a conventional V belt operates between outwardly diverging annular sheave faces of the adjustable pulley. The disclosure also relating to a novel means including a compressible bushing adapted to surround a shaft and lock the adjustable pulley of the invention on the shaft when the relatively adjustable sheave members are clamped together by bolts which extend therethrough generally axially parallel to the axis of shaft receiving openings in the hubs of the sheave members. Additionally, the disclosure relates to the foregoing structures and additionally to spacer washers which may be either placed between the sheave members or on the outer sides thereof so as to vary the spaced relation of the outwardly diverging annular faces of the sheave members in order to vary the pitched diameter at which a standard V belt will run between the said annular faces of the sheave members. The disclosure also relating to modifications of the sheave members and particularly with relation to the fabrication of the sheave members of sheet metal by various methods such as pressing or spinning operations.

6 Claims, 5 Drawing Figures

ADJUSTABLE V BELT PULLEY

BACKGROUND OF THE INVENTION

Various adjustable V belt pulleys have been used so as to vary the pitched diameter at which a V belt runs between two outwardly diverging annular faces and various means have been used to secure such pulleys on a shaft. The prior art adjustable V belt pulleys have been relatively expensive to produce, costly of materials and have required set screws or keys for locking such pulleys on shafts and, accordingly, have posed many problems relative to the economy, installation, maintenance and relative adjustability as such pulleys relate to the range of pitch diameters which such pulleys have accommodated.

SUMMARY OF THE INVENTION

The present invention relates to an adjustable V belt pulley adapted for use on various rotating shafts for transmitting power and the adjustable V belt pulleys of the invention are provided with novel means for spacing a pair of sheave members so as to vary the spaced relation of outwardly converging spaces of the sheave members and to thereby vary the pitched diameter at which a V belt runs between the faces and relative to a shaft on which the sheave members are mounted.

Additionally, the invention comprises a novel means for compressibly locking a resilient sleeve on a shaft in connection with the adjustable V belt pulley of the invention and at the same time clamping the opposed sheave members in certain spaced relation to attain various degrees of pitched diameter adjustment relative to a standard V belt. Clamping bolts are provided for holding the sheave members together and these clamping bolts hold a plurality of spacers either between the sheave members or at the outer sides thereof and at the same time provide for the clamping of a compressible bushing in the hub portions of the sheave members to lock the bushing on a shaft and to thereby lock the entire sheave assembly on a shaft without the use of keys or set screws or the like.

The construction of the adjustable V belt pulley of the invention lends itself to the fabrication of the sheave members either by punch press operations or by conventional rolling or spinning operations such that the sheave members of the pulley may be made of sheet metal and may be very light in weight and very economically produced and at the same time very accurate in annular and concentric configuration. A novel aspect of the invention is that clamping bolts passing through the sheave members axially parallel to the shaft receiving openings in the hubs thereof concurrently clamp the sheave members together in certain spaced relationship which is variable by a plurality of washers which are transferable from position between the sheave members to positions at the outer sides thereof and said clamping bolts at the same time being operable to cause compression of a resilient bushing which locks the assembly on a shaft by said clamping bolts regardless of the spaced relation of the sheave members, such being due to the fact that the washers that are transferable from the positions between the sheave members to positions adjacent the outer sides of the sheave members always provide the proper compressive engagement of the compressible bushing when the sheave members are bolted together in any desired spaced relationship to each other to attain varying degrees of pitched diameter relative to a standard V belt.

Accordingly, it is an object of the invention to provide a very simple and economical adjustable V belt pulley which may be made of sheet metal with a minimum of machining and thus once tools are made for producing the pulley of the invention, no machine work or labor as such is attendant to the production of these pulleys.

Another object of the invention is to provide an adjustable V belt pulley which may be made entirely of sheet metal.

Another object of the invention is to provide a V belt pulley which is adjustable as to pitched diameter and also fixed on a shaft by a common set of clamping bolts.

Another object of the invention is to provide an adjustable V belt pulley which is readily mounted on a shaft by means of a compressible resilient bushing which grips the outer side of the shaft and is, therefore, devoid of such screws, keyways or other expensive machine produced structural arrangements.

Another object of the invention is to provide an adjustable V belt pulley which may be made in various configurations when produced of conventional sheet metal.

Further objects and advantages of the invention may be apparent from the following specification, appended claims and accompanying drawings.

DESCRIPTION OF THE PREFERRED EMBODIMENTS

Figure 1:
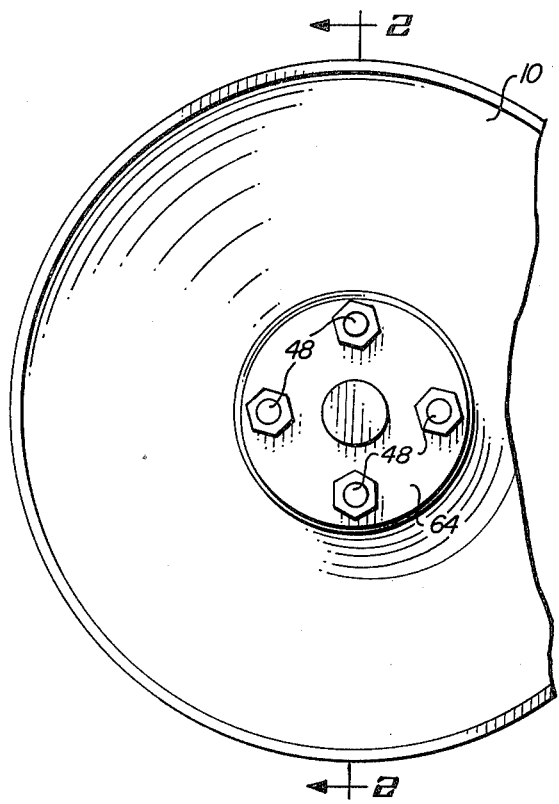
FIG. 1 is a fragmentary end elevational view of an adjustable V belt pulley in accordance with the present invention.
Figure 2:
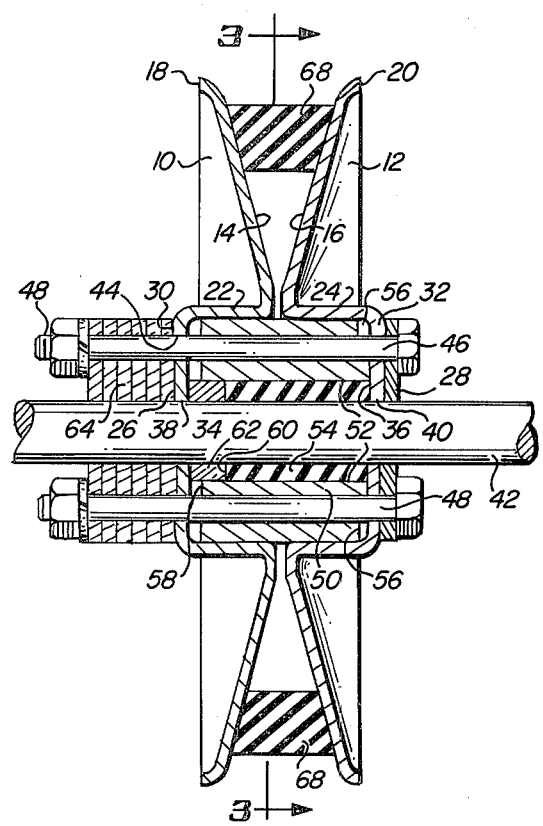
FIG. 2 is a sectional view taken from the line 2—2 of FIG. 1 showing the adjustable V belt pulley of the invention clamped on a shaft and showing a V belt engaged between the sheaves of the pulley at substantially maximum pitched diameter.
Figure 3:
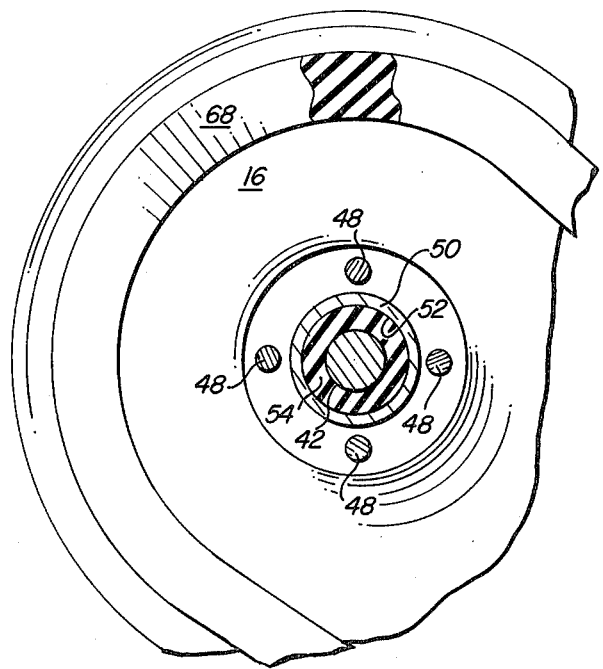
FIG. 3 is a sectional view taken from the line 3—3 of FIG. 2 showing the V belt omitted.

As shown in FIGS. 1 and 2 of the drawings, the adjustable V belt pulley of the invention is provided with a pair of sheave members 10 and 12. These sheave members 10 and 12 are provided with annular pulley engaging faces 14 and 16 which, as shown in FIG. 2 of the drawings, diverge outwardly relative to each other toward peripheral portions 18 and 20 respectively of the sheave members 10 and 12. These sheave members 10 and 12 are provided with respective substantially cylindrical hub portions 22 and 24 having respective end portions 26 and 28. These end portions being provided with respective outer sides 30 and 32 and respective inner sides 34 and 36. The sheave members 10 and 12 are provided with respective concentrically disposed shaft receiving openings 38 and 40 adapted to receive a shaft 42 in concentric relation with the peripheral portions 18 and 20 and in concentric relationship with the outwardly diverging pulley engaging faces 14 and 16.

These sheave members 10 and 12 in their end portions 30 and 32 are provided with bolt receiving openings 44 and 46 respectively through which bolts 48 extend, as shown in FIG. 1, there being four of the bolts 48 and these bolts 48 are spaced radially outward from the shaft receiving openings 38 and 40 hereinbefore described. Disposed inwardly relative to the bolts 48 is a sleeve member 50 having a bore 52 which is of considerably larger diameter than the shaft receiving openings 38 and 40. Disposed in the bore 52 is a resilient bushing 54. The bushing 54 being made of compressible rubber like material and the sleeve 50 is provided with openings 56 through which the bolts 48 extend so as to loke the sleeve against rotation relative to the sheave members 10 and 12.

An end portion 58 of the sleeve 50 extends beyond a respective end 60 of the resilient bushing 54 and a compression ring 62 is disposed in the bore 52 of the sleeve 50 and engages the end 60 of the resilient bushing 54. The compression ring 62 extends beyond the end 58 of the sleeve 50 so that clamping force on the compression ring in a direction toward the compressible bushing 54 causes it to be compressively expanded tightly between the bore 52 of the sleeve 50 and the periphery of the shaft 52 thereby locking the sleeve 50 and the sheave members 10 and 12 on the shaft 42.

A plurality of spacer washers 64 are provided with openings through which the bolts 48 extend and these washers 64 may be placed on the outer sides of the end portions 26 and 28 of the sheave members 10 and 12, as shown in FIG. 2 of the drawings, or may be placed on the inner sides of these portions 26 or 28 so that the washers 64 may be transferred from positions at the ends of the sheave members 10 or 12, as shown in FIG. 2, to positions between the hub portions of the sheave members to vary the pitched diameter of the adjustable pulley of the invention.

Figure 4:
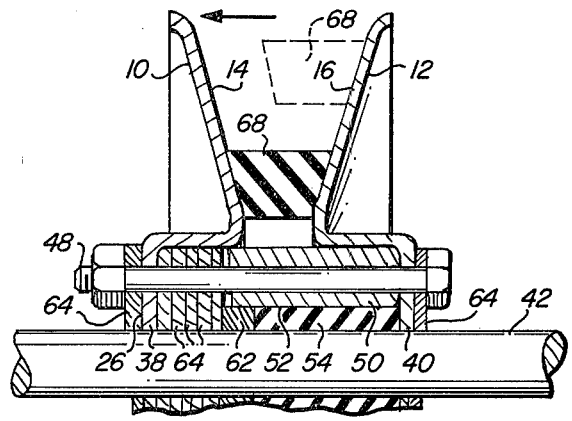
FIG. 4 is a fragmentary view similar to FIG. 2 but showing the adjustable V belt pulley of the invention adjusted so as to provide for nominal or substantially minimum pitched diameter relative to a V belt engaged with the diverging faces of the sheave members of the invention.

As shown in FIG. 2 of the drawings, a V belt 68 is disposed near maximum pitched diameter between the sheave members 10 and 12 at the divering faces 14 and 16 and, as shown in FIG. 4, the same V belt 68 is disposed at nearly minimum pitched diameter between the sheave faces 14 and 16. As can be seen, the compression ring 62 may be engaged either by an end portion 26 of the sheave member 10 or by one of the washers 64 when placed inside the end portion 26 and in a position between the hub portions of the sheave members 10 and 12. The broken line position of the V belt 68, shown in FIG. 4, is comparable to the solid line position of the V belt 68, shown in FIG. 2, and the solid line position of the V belt 68 shown in FIG. 4, thus illustrates the degree to which the adjustable pulley of the invention may be adjusted to vary the pitched diameter of the pulley simply by transferring the washers 64 from the position shown in FIG. 2 to the position shown in FIG. 4, all of which retains the same relationship of the compression ring 62, resilient bushing 54 and the sleeve 50, all hereinbefore described.

It will be seen that the configuration of the sheave members 10 and 12 as shown in FIG. 2 of the drawings, may be formed by shearing circular disks and punch press forming the diverging portions 14 and 16 integral with the hub portions 22 and 24 which are substantially cylindrical with end portions 26 and 28 which are substantially normal to the axis of the openings 38 and 40 extending therethrough.

Figure 5:
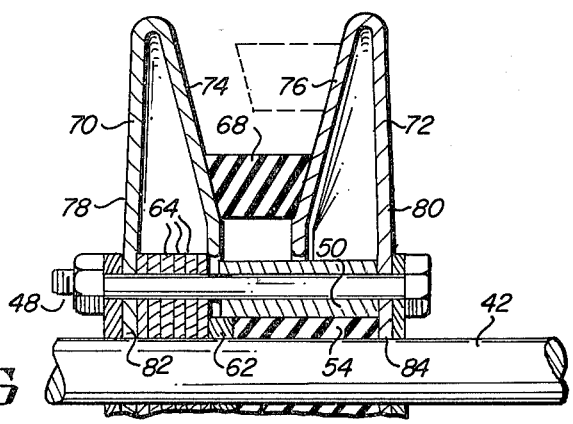
FIG. 5 is a view similar to FIG. 4 showing a modification of the sheave members of the invention.

In the modification, as shown in FIG. 5 of the drawings, the corresponding sheave members 70 and 72 are provided with relatively diverging faces 74 and 76 which correspond with the faces 14 and 16 hereinbefore described.

The sheave faces 74 and 76 are spun radially inward in diverging relationship to each other, however, the parts are made individually by this process and are identical in configuration. These sheave members 70 and 72 are provided with straight sides 78 and 80 normal to the axis of respective shaft receiving openings 82 and 84 which are adapted to surround the shaft 42 as hereinbefore described. The sleeve 50, resilient bushing 54 and compression ring 62 are similar to that hereinbefore described and, additionally, the bolts 48 as well as the spacer washers 64 are substantially identical to those hereinbefore described in connection with FIGS. 2 and 4 of the drawings. The V belt 68 is shown in substantially the same position as that shown in FIG. 4 and it will be obvious to those skilled in the art that the washers 64, shown in FIG. 5, may be transferred from the position between the hub portions of the sheave members 70 and 72 to positions on the outer sides thereof, as shown in FIG. 2 of the drawings.

It will be obvious to those skilled in the art that various modifications may be resorted to without departing from the spirit of the invention.

I claim:

1. An adjustable V belt pulley comprising a pair of circular sheave members each having a concentric shaft receiving opening therein; each sheave member having an annular belt engaging face; said faces of said pair diverging from each other in a direction radially outward away from said shaft receiving openings; said sheave members having hub portions surrounding said shaft receiving openings; said hub portions having bolt receiving openings disposed in axially parallel relation to said shaft receiving openings; said hub portions having inner sides facing each other and having outer sides opposed to said inner sides; a sleeve secured between said hub portions; said sleeve having a bore of larger diameter than said shaft receiving openings; a resiliently compressible bushing in said bore; said bushing having a concentric bore substantially equal in diameter to said shaft receiving opening; a compression ring disposed in said bore and engaging one end of said compressible bushing; said sleeve having an end portion; said compression ring extending beyond said end portion when said compression ring is abuted to said compressible bushing; and bolts in said bolt receiving opening and adapted when tightened to force said hub portions together and to thereby force said compression ring to compress said compressible bushing around a shaft extending through said shaft receiving openings to thereby frictionally lock said sheave members on a shaft.

2. The invention as defined in claim 1, wherein: a plurality of spacer washers are disposed and adapted to be located selectively between one of said hub portions and said compression ring to thereby adjustably space the spaced relation of said diverging belt engaging faces to thereby adjust the pitch diameter of said pulley with respect to a conventional V belt engaged between said belt engaging faces.

3. The invention as defined in claim 2, wherein: said spacer washers are selectively locatable on said bolts either between said hub portions or on said bolts adjacent to and contiguous with outer sides of said hub portions; whereby said pitch diameter may be varied to a degree depending on how many of said spacer washers are transferred from a position between said hub portions to a position at said outer sides of said sheave members or vice versa.

4. The invention as defined in claim 1, wherein: said sheave members are of sheet metal.

5. The invention as defined in claim 1, wherein: said sleeve is disposed radially inward relative to said bolts.

6. The invention as defined in claim 5, wherein: said sleeve is provided with an opening through which at least one of said bolts extends whereby said sleeve is fixed against rotation relative to said sheave members.

* * * * *